(12) United States Patent
Choi et al.

(10) Patent No.: US 12,149,269 B2
(45) Date of Patent: Nov. 19, 2024

(54) TRANSMITTER CIRCUIT AND OPERATION METHOD THEREOF

(71) Applicant: Samsung Electronics Co., Ltd., Suwon-si (KR)

(72) Inventors: Moon-Chul Choi, Suwon-si (KR); Sung-Yong Cho, Suwon-si (KR); Jaehyeok Baek, Suwon-si (KR); Donggun An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 18/189,521

(22) Filed: Mar. 24, 2023

(65) Prior Publication Data

US 2023/0403040 A1 Dec. 14, 2023

(30) Foreign Application Priority Data

Jun. 10, 2022 (KR) .................. 10-2022-0070998
Aug. 19, 2022 (KR) .................. 10-2022-0104214

(51) Int. Cl.
*H04B 1/3827* (2015.01)
*H04B 1/04* (2006.01)
*H04B 7/005* (2006.01)

(52) U.S. Cl.
CPC ......... *H04B 1/0458* (2013.01); *H04B 1/0475* (2013.01); *H04B 7/005* (2013.01)

(58) Field of Classification Search
CPC ......... H04L 25/03885; H04L 25/03057; H04L 25/03878; H04L 2025/03445; H04L 25/0272; H04L 25/0292; H04L 27/01; H03H 17/0226; H03H 17/0227; H03H 17/06; H03H 17/0607; H03H 2017/0081; H04B 1/3827; H04B 15/04; H04B 7/0482; H04B 7/0639; H04B 10/541; H04B 1/0475; H04B 1/40; H04B 10/40; H04B 7/10
USPC ....................................................... 375/296
See application file for complete search history.

(56) References Cited

U.S. PATENT DOCUMENTS

| | | | |
|---|---|---|---|
| 7,884,659 B2 | 2/2011 | Jang et al. | |
| 8,692,600 B1* | 4/2014 | Blanco | H03K 5/135 327/170 |
| 10,447,512 B2 | 10/2019 | Lin et al. | |
| 10,496,581 B2 | 12/2019 | Lin et al. | |
| 10,848,352 B1* | 11/2020 | Rathor | G11C 7/222 |
| 11,057,247 B2 | 7/2021 | Dong | |
| 11,082,267 B1 | 8/2021 | Kumar et al. | |
| 11,152,962 B2 | 10/2021 | Park et al. | |
| 11,223,468 B1 | 1/2022 | Ryu et al. | |

(Continued)

*Primary Examiner* — Eva Y Puente
(74) *Attorney, Agent, or Firm* — Myers Bigel, P.A.

(57) ABSTRACT

In a transmitter circuit, an impedance calibration circuit is configured to generate an impedance code for impedance matching, an encoder is configured to receive the impedance code and to generate a delay compensation signal based on the impedance code. A delay circuit is configured to output delay data that are delayed from input data by a delay value determined based on the delay compensation signal. A feed-forward equalizer is configured to receive the input data and the delay data, and to equalize the input data based on a main coefficient used for the input data and an equalization coefficient used for the delay data to generate transmission data.

20 Claims, 10 Drawing Sheets

(56) References Cited

U.S. PATENT DOCUMENTS

| | | | |
|---|---|---|---|
| 2011/0241807 A1* | 10/2011 | Matsui | H04L 25/03885 333/28 R |
| 2013/0057321 A1* | 3/2013 | Rao | H04L 25/49 327/108 |
| 2013/0230093 A1* | 9/2013 | Aziz | H04L 25/03885 375/233 |
| 2015/0381393 A1* | 12/2015 | Kotagiri | H04L 7/033 375/233 |
| 2020/0106649 A1* | 4/2020 | Peng | H04L 25/03343 |
| 2021/0141747 A1 | 5/2021 | Jeong et al. | |
| 2022/0101894 A1 | 3/2022 | Lee et al. | |

* cited by examiner

TRANSMITTER CIRCUIT AND OPERATION METHOD THEREOF

CROSS-REFERENCE TO RELATED APPLICATION

This application claims priority to and the benefit of Korean Patent Application No. 10-2022-0070998 filed in the Korean Intellectual Property Office on Jun. 10, 2022, and Korean Patent Application No. 10-2022-0104214 filed in the Korean Intellectual Property Office on Aug. 19, 2022, the entire contents of which are incorporated herein by reference.

BACKGROUND (a) Field

The disclosure relates to a transmitter circuit.

(b) Description of the Related Art

Feed-forward equalization (FFE) may be used as an equalization technology in a transmitter of a semiconductor memory. The performance of the FFE may be determined based on a delay difference between a main path and an equalization path and an equalization strength. The performance of the FFE may degrade based on process-voltage-temperature (PVT) variations. For example, the delay may change due to the PVT change, which may degrade the performance of the FFE.

SUMMARY

Some embodiments may provide a transmitter circuit and an operation method thereof for reducing or preventing FFE performance deterioration based on a PVT change.

A transmitter circuit according to an embodiment may include an encoder, a delay circuit, and an FFE. The impedance calibration circuit may be configured to generate an impedance code for impedance matching. The encoder may be configured to receive an impedance code that is generated based on impedance calibration for impedance matching and to generate a delay compensation signal based on the impedance code. The delay circuit may be configured to output delay data that are delayed by a delay value from input data, and the delay value may be determined based on the delay compensation signal. The FFE may be configured to receive the input data and the delay data, and to equalize the input data based on a main coefficient used for the input data and an equalization coefficient used for the delay data to generate transmission data.

A transmitter circuit according to another embodiment may include a delay circuit, a delay replica, a first encoder, and an FFE. The delay circuit may be configured to delay input data by a delay value to generate output delay data, and the delay replica may be configured to have a same delay characteristic as the delay circuit. The first encoder may be configured to generate a delay compensation signal based on information from the delay replica, the delay circuit being further configured to determine the delay value based on the delay compensation signal. The FFE may be configured to receive the input data and the delay data, and to equalize the input data based on a main coefficient used for the input data and an equalization coefficient used for the delay data to generate transmission data.

A transmitter circuit according to yet another embodiment may include an encoder, a delay circuit, and an FFE. The encoder may be configured to receive an impedance code that is generated based on impedance calibration for impedance matching and to generate an equalization compensation signal based on the impedance code. The delay circuit may be configured to output delay data that are delayed by a delay value from input data. The FFE may be configured to receive the input data and the delay data, to determine an equalization coefficient used for the delay data based on the equalization compensation signal, and to equalize the input data based on a main coefficient used for the input data and the equalization coefficient to generate transmission data.

DETAILED DESCRIPTION OF THE EMBODIMENTS

Figure 1:
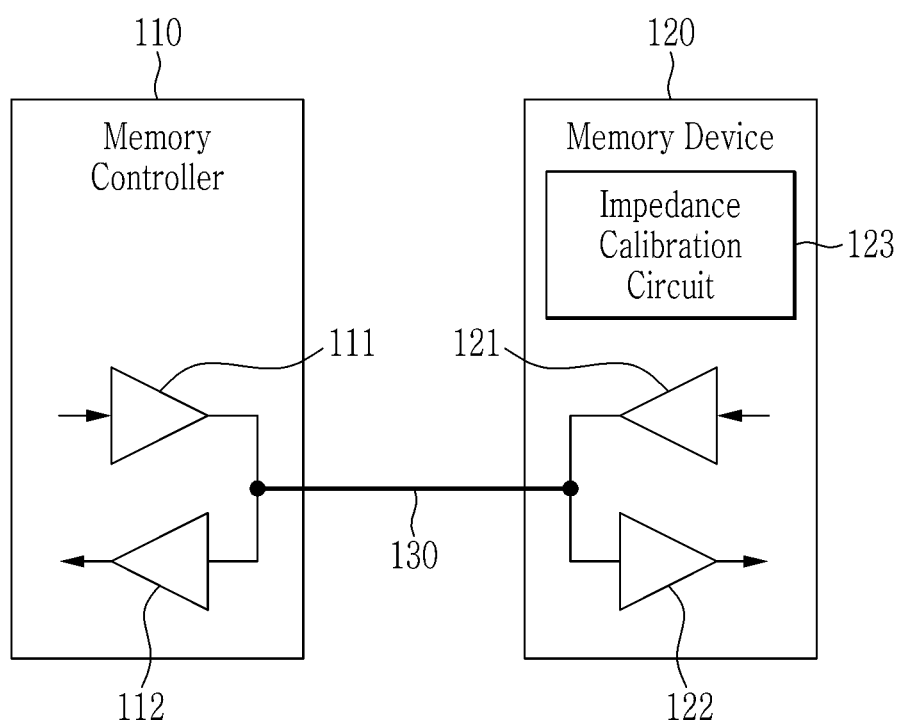
FIG. 1 is a drawing illustrating an example of a memory system according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

FIG. 1 is a drawing illustrating an example of a memory system according to an embodiment.

Referring to FIG. 1, a memory system 100 may include a memory controller 110 and a memory device 120. The memory controller 110 and the memory device 120 may be connected through a memory interface, and send and receive signals through the memory interface. The memory interface may include a channel 130 for sending and receiving the signals.

The memory controller 110 may provide a signal to the memory device 120 to control a memory operation of the memory device 120. The signal may include a command and an address. The memory controller 110 may provide the command and the address to the memory device 120 to control the memory operation, such as read or write. Read data may be transferred from the memory device 120 to the memory controller 110 in a read operation, and write data may be transferred from the memory controller 110 to the memory device 120 in a write operation.

The memory device 120 may be a storage device based on a semiconductor device. In some embodiments, the memory device 120 may include a dynamic random-access memory (DRAM) device. In some embodiments, the memory device 120 may include other volatile or non-volatile memory devices that can use a transmitter to be described below.

The memory controller 110 may include a transmitter 111 and a receiver 112, and the memory device 120 may also include a transmitter 121 and a receiver 122. The transmitter 111 of the memory controller 110 may be configured to transmit data to the memory device 120 through the channel 130, and the receiver 122 of the memory device 120 may be configured to receive the data transmitted from the memory controller 110. The transmitter 121 of the memory device 120 may be configured to transmit data to the memory controller 110 through the channel 130, and the receiver 112 of the memory controller 110 may be configured to receive the data transmitted from the memory device 120. In some embodiments, the data may include a signal, such as read data, write data, a command, or an address.

In some embodiments, the memory device 120 may further include an impedance calibration circuit 123. The impedance calibration circuit 123 can adjust an impedance for impedance matching between the memory controller 110 and the memory device 120. An impedance code may be generated by an impedance calibration operation for impedance matching. In some embodiments, the impedance calibration circuit 123 may be configured to generate an impedance code that adjusts a pull-up impedance and/or a pull-down impedance in response to a PVT change or variation. That is, the impedance calibration circuit 123 may be configured to generate the impedance code for calibrating the PVT change or variation. In some embodiments, the impedance calibration circuit 123 may be a ZQ calibration circuit used in a DRAM, and the impedance code may be a ZQ code used in a DRAM. Because the impedance calibration circuit 123 may be implemented using various methods, a description thereof is omitted. Hereinafter, the impedance code is described as the ZQ code for convenience of description.

Figure 2:
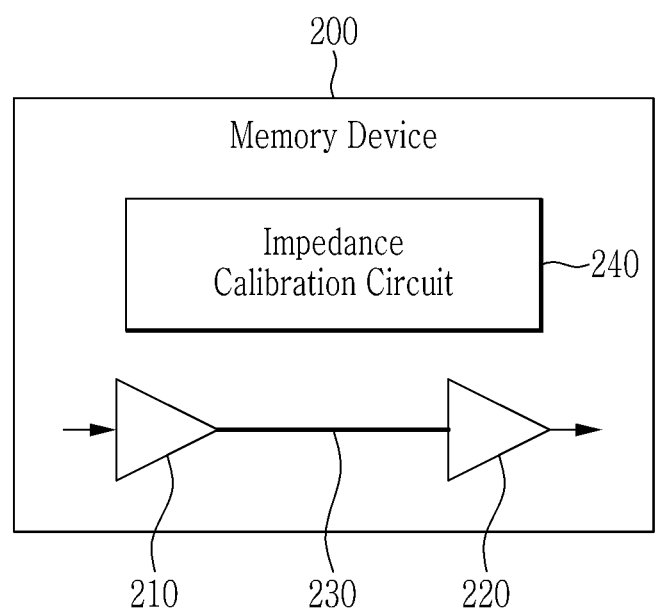
FIG. 2 is a drawing illustrating an example of a memory device according to an embodiment.

FIG. 2 is a drawing illustrating an example of a memory device according to an embodiment.

Referring to FIG. 2, a memory device 200 may include a transmitter 210 and a receiver 220. The transmitter 210 and the receiver 220 may be connected through a channel 230. In some embodiments, the transmitter 210 and the receiver 220 may be configured to perform die-to-die communication within the memory device 200. The transmitter 210 may be configured to transmit data to the receiver 220 through channel 230, and the receiver 220 may be configured to receive the data transmitted from the transmitter 210. In some embodiments, the memory device 200 may further include an impedance calibration circuit 240.

Figure 3:
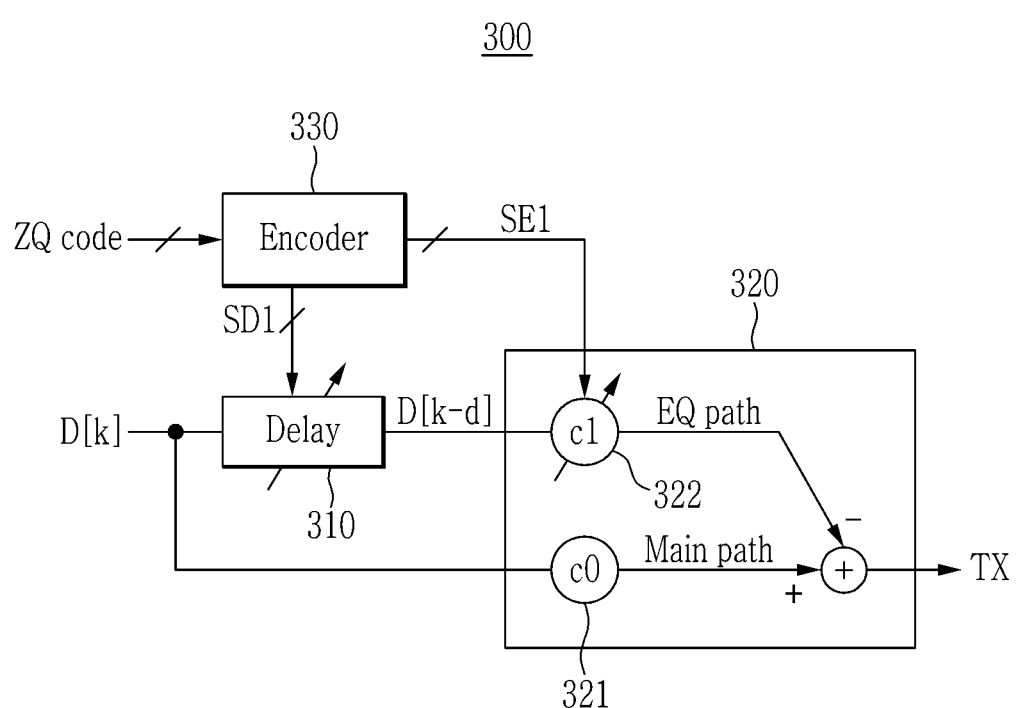
FIG. 3 is a drawing illustrating an example of a transmitter circuit according to an embodiment.

FIG. 3 is a drawing illustrating an example of a transmitter circuit according to an embodiment. A transmitter circuit 300 may correspond to a transmitter 111 or 121 described with reference to FIG. 1 or a transmitter 210 described with reference to FIG. 2.

Referring to FIG. 3, the transmitter circuit 300 may include a delay circuit 310, a feed-forward equalizer (FFE) 320, and an encoder 330. The FFE 320 may include a main driver 321 and an equalizer 322. In some embodiments, the main driver 321 may be referred to as a main tap or main path, and the equalizer 322 may be referred to as an equalization tap (EQ tap) or equalization path (EQ path). In some embodiments, the transmitter circuit 300 may include a plurality of slices that are configured to receive input data D[k], and each slice may include the FFE 320 shown in FIG. 3.

The delay circuit 310 may be configured to delay the input data D[k], and may be a variable delay in which a delay value can be varied. The delay circuit 310 may output delay data D[k−d], which may correspond to the input data D[k] by a delay value d. For example, when the delay value d of the delay circuit 310 is 1 UI (unit interval), the delay circuit 310 may output delay data D[k−1] delayed by 1 UI.

The main driver 321 may be configured to output data in which a coefficient (referred to as a "main coefficient") c0 of the main driver 321 is reflected in the input data D[k]. For example, the main driver 321 may output c0*D[k]. The equalizer 322 may be configured to output data in which a coefficient (referred to as an "equalization coefficient") c1 of the equalizer 322 is reflected in the delay data D[k−d]. For example, the equalizer 322 may be configured to output c1*D[k−d]. The equalization strength of the equalizer 322 may be determined based on the equalization coefficient. In some embodiments, the equalizer 322 may be configured to control an output of equalizer 322 to subtract the output of equalizer 322 from the output of the main driver 321. For example, output data $D_{out}[k]$ of the FFE 320 may be given as (c0*D[k]−c1*D[k−d]).

In this way, when the FFE 320 controls the equalizer 322 to subtract the output of the equalizer 322 from the output of the main driver 321, an insertion loss in a channel (e.g., 130 in FIG. 1 or 230 in FIG. 2) may be compensated for. For example, the transmitter circuit 300 may be configured to implement a high-pass function to equalize low-pass characteristics of the channel 130 or 230.

The encoder 330 may be configured to adjust the delay value of the delay circuit 310 and/or the equalization coefficient of the FFE 320. In some embodiments, the encoder 330 may be configured to adjust the delay value of the delay circuit 310 and/or the equalization coefficient of the FFE 320 based on a PVT change or variation. The encoder 330 may be configured to provide a delay compensation signal SD1 indicating the delay value of the delay circuit 310 to the delay circuit 310, and the delay circuit 310 may be configured to set the delay value based on the delay compensation signal SD1. The encoder 330 may be configured to provide an equalization compensation signal SE1 indicating the equalization coefficient of the FFE 320 to the FFE 320, and the FFE 320 may be configured to set the equalization coefficient based on the equalization compensation signal SE1. In some embodiments, the encoder 330 may include an encoder that may be configured to generate the delay compensation signal SD1 and an encoder that may be configured to generate the equalization compensation signal SE1.

The encoder 330 may be configured to receive a ZQ code and may be configured to adjust the delay value of the delay circuit 310 based on the ZQ code. The encoder 330 may be configured to provide the delay compensation signal SD1 indicating the adjusted delay value to the delay circuit 310, and the delay circuit 310 may be configured to delay input data by the delay value determined based on the delay compensation signal SD1. In some embodiments, an impedance calibration circuit of the memory device (e.g., 123 in FIG. 1 or 240 in FIG. 2) may be configured to generate a ZQ code (i.e., a ZQ code indicating a PVT change) that can calibrate the PVT change or variation and provide the generated ZQ code to the encoder 330. The encoder 330 may be configured to adjust the delay value in an opposite direction of the PVT change or variation indicated by the ZQ code. For example, the encoder 330 may be configured to decrease the delay value of the delay circuit 310 when the ZQ code indicates a PVT variation in which a delay increases, and may increase the delay value of the delay circuit 310 when the ZQ code indicates a PVT variation in which the delay decreases. The PVT case in which the delay increases may be, for example, a variation, such as, but not limited to, slow process (SS), low voltage (LV), and high temperature (HT), and the PVT variation in which the delay decreases may be, for example, a variation, such as, but not limited to, fast process (FF), normal voltage (NV), and regular temperature (RT).

The encoder 330 may be configured to adjust the equalization coefficient of the equalizer 322 of the FFE 320 based on the ZQ code. The encoder 330 may be configured to provide the equalization compensation signal SE1 indicating the adjusted equalization coefficient to the equalizer 322, and the equalizer 322 may be configured to set the equalization coefficient based on the equalization compensation signal SE1. The encoder 330 may be configured to adjust the equalization coefficient in the opposite direction of the PVT change indicated by the ZQ code. For example, the equalization coefficient of the equalizer 322 may decrease in the PVT variation case in which the delay increases, and may increase in the PVT variation case in which the delay decreases. Accordingly, the encoder 330 may be configured to increase the equalization coefficient of the equalizer 322 when the ZQ code indicates the PVT variation case in which the delay increases, and may decrease the equalization coefficient of the equalizer 322 when the ZQ code indicates the PVT variation case in which the delay decreases.

In some embodiments, the encoder 330 may be configured to set at least some bits of the ZQ code as the equalization compensation signal SE1. The encoder 330 may be configured to set most significant bits corresponding to the number of bits of the equalization compensation signal SE1 among bits of the ZQ code as the equalization compensation signal SE1. For example, when the equalization compensation signal SE1 has N bits, the encoder 330 may be configured to set the N most significant bits of the ZQ code as the equalization compensation signal SE1. Here, N is an integer greater than or equal to one. The equalizer 322 of the FFE 320 may be configured to set the equalization coefficient based on the equalization compensation signal SE1. For example, when the 3 most significant bits ZQ[6], ZQ[5], and ZQ[4] in the 7-bit ZQ code are used as the 3 bits SE1[2], SE1[1], and SE1[0] of the equalization compensation signal SE1, the delay compensation signal SD1 and the equalization compensation signal SE1 according to the input (i.e., ZQ code) of the encoder 330 may be given as shown in Table 1. As shown in Table 1, the delay compensation signal SD1 may indicate, for example, an increase by a predetermined value from a current delay value, a decrease by a predetermined value from the current delay value, or maintaining the current delay value.

TABLE 1

| Input | | | Delay compensation signal | Equalization compensation signal | | |
|---|---|---|---|---|---|---|
| ZQ[6] | ZQ[5] | ZQ[4] | Delay value | SE1[2] | SE1[1] | SE1[0] |
| 0 | 0 | 0 | Increase | 0 | 0 | 0 |
| 0 | 0 | 1 | Increase | 0 | 0 | 1 |
| 0 | 1 | 0 | Increase | 0 | 1 | 0 |
| 0 | 1 | 1 | Increase | 0 | 1 | 1 |
| 1 | 0 | 0 | Maintain | 1 | 0 | 0 |
| 1 | 0 | 1 | Decrease | 1 | 0 | 1 |
| 1 | 1 | 0 | Decrease | 1 | 1 | 0 |
| 1 | 1 | 1 | Decrease | 1 | 1 | 1 |

The transmitter circuit 300 may be configured to output equalized data by subtracting data output through the equalizer 322 from data output through the main driver 321, and may be configured to transmit the equalized data as a transmission signal TX.

According to the above-described embodiments, the transmitter circuit 300 can compensate for the PVT change or variation by adjusting the delay value of the delay circuit 310 and/or the equalization coefficient of the equalizer 322 in the opposite direction of the PVT change based on the ZQ code indicating the PVT change or variation, thereby transmitting the transmission signal in which the PVT change is compensated for. Therefore, it is possible to prevent the performance deterioration of the FFE 320 due to the PVT change in the transmitter circuit 300. In some embodiments, by using some bits of the ZQ code as the equalization compensation signal SE1, when the main coefficient of the main driver 321 of the FFE 320 is compensated based on the ZQ code, the equalization coefficient of the equalizer 322 can be adjusted in synchronization with the compensation of the main coefficient.

Figure 4:
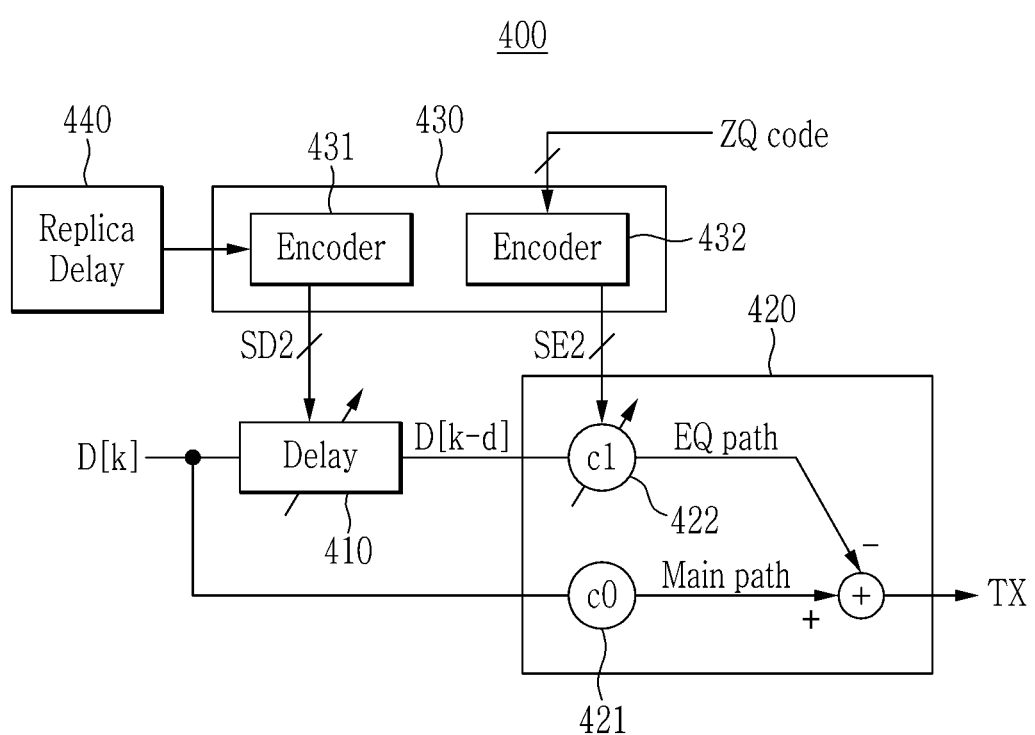
FIG. 4 is a drawing illustrating an example of a transmitter circuit according to an embodiment.

FIG. 4 is a drawing illustrating an example of a transmitter circuit according to an embodiment. A transmitter circuit 400 may correspond to a transmitter 111 or 121 described with reference to FIG. 1 or a transmitter 210 described with reference to FIG. 2.

Referring to FIG. 4, the transmitter circuit 400 may include a delay circuit 410, an FFE 420, an encoder 430, and a delay replica 440. The FFE 420 may include a main driver 421 and an equalizer 422. In some embodiments, the transmitter circuit 400 may include a plurality of slices that may be configured to receive input data D[k], and each slice may include the FFE 420 shown in FIG. 4.

As described with reference to FIG. 3, the main driver 421 may be configured to output data in which a main coefficient c0 is reflected in the input data D[k]. Further, the delay circuit 410 may be configured to output delay data D[k−d] delayed by a delay value from the input data D[k], and the equalizer 422 may be configured to output data in which an equalization coefficient c1 is reflected in the delay data D[k−d]. In some embodiments, the equalizer 422 may be configured to control the output of equalizer 422 to subtract the output of equalizer 422 from the output of main driver 421. The encoder 430 may include an encoder 431 that may be configured to provide a delay compensation signal SD2 for compensating for a PVT change to the delay circuit 410 and/or an encoder 432 that may be configured to provide an equalization compensation signal SE2 for compensating for the PVT change to the FFE 420, i.e., the equalizer 422.

The delay replica 440 may be a delay circuit having the same delay characteristic as that of the delay circuit 410. The encoder 431 may be configured to adjust the delay value of the delay circuit 410 based on information of the delay replica 440. In some embodiments, the delay replica 440 may be configured to provide a delay value to the encoder 431, and the encoder 431 may be configured to adjust the delay value of the delay circuit 410 based on the delay value of the delay replica 440. In some embodiments, the encoder 431 may be configured to determine the delay value of the delay replica 440 based on an output (e.g., delay data) of the delay replica 440, and may be configured to adjust the delay value of the delay circuit 410 based on the delay value of the delay replica 440. In this case, because the delay replica 440 has the same delay characteristic as that of the delay circuit 410, the delay value of the delay replica 440 may be changed to be the same as the delay value of the delay circuit 410 according to the PVT change or variation. Accordingly, the encoder 431 may be configured to adjust the delay value of the delay circuit 410 in an opposite direction of the change in the delay value of the delay replica 440. The encoder 431 may be configured to provide the delay compensation signal SD2 indicating the delay value of the delay circuit 410 to the delay circuit 410, and the delay circuit 410 may be configured to set the delay value based on the delay compensation signal SD2. For example, the encoder 431 may be configured to decrease the delay value of the delay circuit 410 when the delay value of the delay replica 440 increases according to the PVT change or variation, and may be configured to increase the delay value of the delay circuit 410 when the delay value of the delay replica 440 decreases according to the PVT change or variation. Accordingly, the encoder 431 may be configured to compensate for the delay value of the delay circuit 410 according to the PVT change or variation based on the delay value of the delay replica 440.

As described with reference with FIG. 3, the encoder 432 may be configured to adjust the equalization coefficient of the equalizer 422 based on a ZQ code. The encoder 432 may be configured to provide the equalization compensation signal SE2 indicating the equalization coefficient of the equalizer 422 to the equalizer 422, and the equalizer 422 may be configured to set the equalization coefficient based on the equalization compensation signal SE2.

The transmitter 400 may be configured to output equalized data by subtracting data output through the equalizer 422 from data output through the main driver 421, and may be configured to transmit the equalized data as a transmission signal.

According to the above-described embodiments, the transmitter 400 can accurately compensate for the delay value of the delay circuit 410 according to the PVT change or variation by adjusting the delay value of the delay circuit 410 using the delay replica 440. Further, the transmitter 400 can compensate for the equalization coefficient of the FFE 420 according to the PVT change or variation based on the ZQ code indicating the PVT change.

Figure 5:
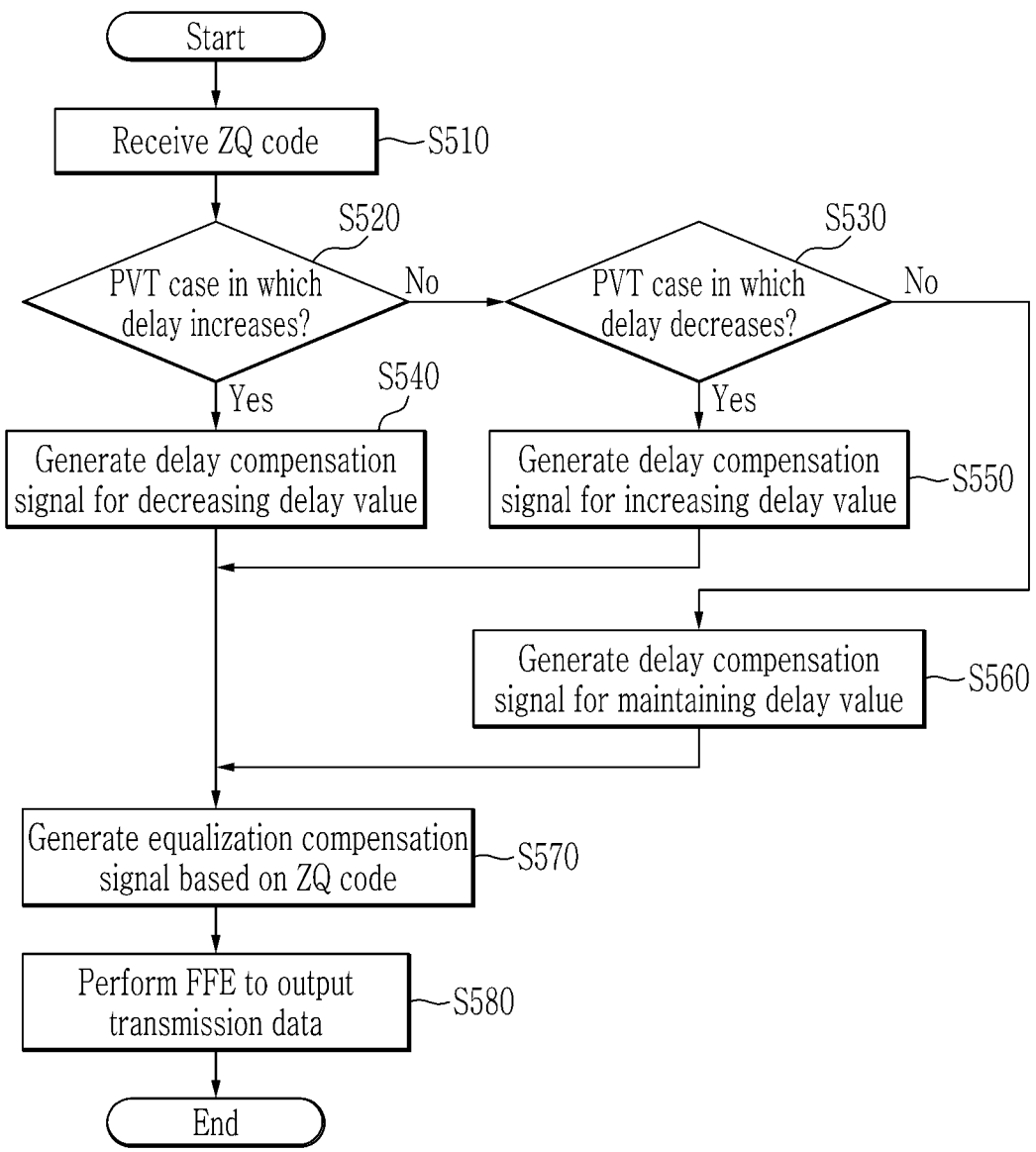
FIG. 5 is a flowchart illustrating an example of an operation method of a transmitter circuit according to embodiments.

FIG. 5 is a flowchart illustrating an example of an operation method of a transmitter circuit according to an embodiment.

Referring to FIG. 5, a transmitter circuit may receive a ZQ code from an impedance calibration circuit at S510. The transmitter circuit may determine whether a current PVT variation is a PVT variation in which a delay increases or a PVT variation in which a delay decreases at S520 and S530. In some embodiments, the transmitter circuit may determine the current PVT variation based on the ZQ code. In some embodiments, the transmitter circuit may determine the current PVT variation based on a delay replica having the same delay characteristic as a delay circuit of the FFE.

If the current PVT variation is a PVT variation in which the delay increases at S520, the transmitter circuit may generate a delay compensation signal for decreasing a delay value at S540. If the current PVT variation is a PVT variation in which the delay decreases at S530, the transmitter circuit may generate the delay compensation signal for increasing the delay value at S550. If the current PVT variation is a PVT variation in which there is no change in the delay, the transmitter circuit may generate the delay compensation signal for maintaining the delay value at S560.

Further, the transmitter circuit may generate an equalization compensation signal based on the ZQ code at S570. In some embodiments, the transmitter circuit may generate the equalization compensation signal using a predetermined number of most significant bits in the ZQ code at S570. In some embodiments, the transmitter circuit may generate the equalization compensation signal based on the PVT variation indicated by the ZQ code at S570. If the PVT variation is a PVT variation in which the delay increases, the transmitter circuit may generate the equalization compensation signal for increasing an equalization coefficient. If the PVT variation is a PVT variation in which the delay decreases, the transmitter circuit may be configured to generate the equalization compensation signal for decreasing the equalization coefficient.

The transmitter circuit may be configured to output transmission data by performing feedforward equalization on input data using a delay value set based on the delay compensation signal and an equalization coefficient set based on the equalization compensation signal at S580.

Next, various examples of a delay circuit and an FFE that may be used in a transmitter circuit according to various embodiments are described with reference to FIG. 6 to FIG. 10. The delay and FFE of the transmitter circuit are not limited to the examples described with reference to FIG. 6 to FIG. 10.

Figure 6:
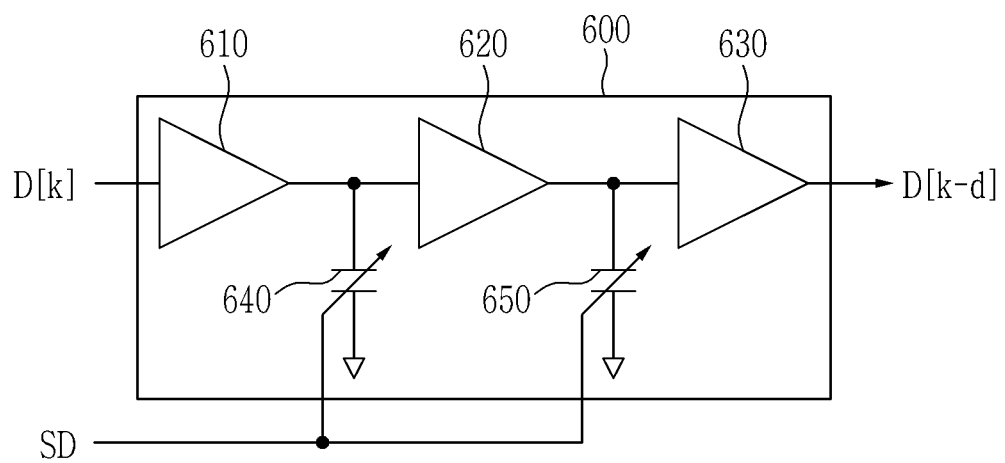
FIG. 6 and FIG. 7 are circuit diagrams illustrating examples of a delay circuit in a transmitter circuit according to embodiments.

FIG. 6 is a circuit diagram illustrating an example of a delay circuit in a transmitter circuit according to an embodiment.

Referring to FIG. 6, a delay circuit 600 may include a variable delay line to control a delay value. In some embodiments, the variable delay line 600 may include a plurality of delay cells 610, 620, and 630, and one or more variable capacitors 640 and 650. Although FIG. 6 shows three delay cells 610, 620, and 630, and two variable capacitors 640 and 650 for convenience, the number of delay cells 610, 620, and 630, and the number of variable capacitors 640 and 650 are not limited thereto. In some embodiments, the capacitors 640 and 650 may be implemented as switched capacitors.

The delay cells 610, 620, and 630 may be connected in series to sequentially delay input data D[k]. For example, the input data may be input to an input terminal of the delay cell 610, an output terminal of the delay cell 610 may be connected to an input terminal of the delay cell 620, an output terminal of the delay cell 620 may be connected to an input terminal of the delay cell 630, and delay data D[k−d] may be output from an output terminal of the delay cell 630.

The variable capacitors 640 and 650 each may have a capacitance that varies in response to a delay compensation signal SD. The delay compensation signal SD may be a delay compensation signal SD1 provided by an encoder 330 shown in FIG. 3 or a delay compensation signal SD2 provided by an encoder 431 shown in FIG. 4. In some embodiments, the switched capacitors 640 and 650 may be turned on or turned off in response to the delay compensation signal SD so that the capacitances of the capacitors 640 and 650 may be varied. Delay values in the delay cells 610, 620, and 630 may be adjusted according to the variable capacitances of the variable capacitors 640 and 650.

Figure 7:
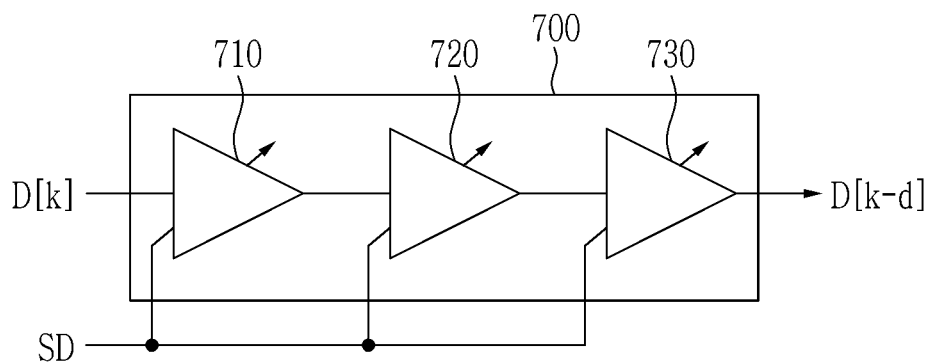

FIG. 7 is a circuit diagram illustrating another example of a delay circuit in a transmitter circuit according to an embodiment.

Referring to FIG. 7, a delay circuit 700 may include a variable delay line to control a delay value. In some embodiments, the variable delay line 700 may include a plurality of delay cells 710, 720, and 730, and at least some of the delay cells 710, 720, and 730 may be variable delay cells. Although FIG. 7 shows three delay cells 710, 720, and 730 for convenience, the number of delay cells 710, 720, and 730 is not limited thereto. Further, FIG. 7 shows that all three delay cells 710, 720, and 730 are variable delay cells for convenience, but the number of variable delay cells among the delay cells 710, 720, and 730 is not limited thereto.

The delay cells 710, 720, and 730 may be connected in series to sequentially delay input data. For example, the input data may be input to an input terminal of the delay cell 710, an output terminal of the delay cell 710 may be connected to an input terminal of the delay cell 720, an output terminal of the delay cell 720 may be connected to an input terminal of the delay cell 730, and delay data may be output from an output terminal of the delay cell 730. Delay values of the delay cells 710, 720, and 730 may be adjusted in response to a delay compensation signal SD. The delay compensation signal SD may be a delay compensation signal SD1 provided by an encoder 330 shown in FIG. 3 or a delay compensation signal SD2 provided by an encoder 431 shown in FIG. 4.

Figure 8:
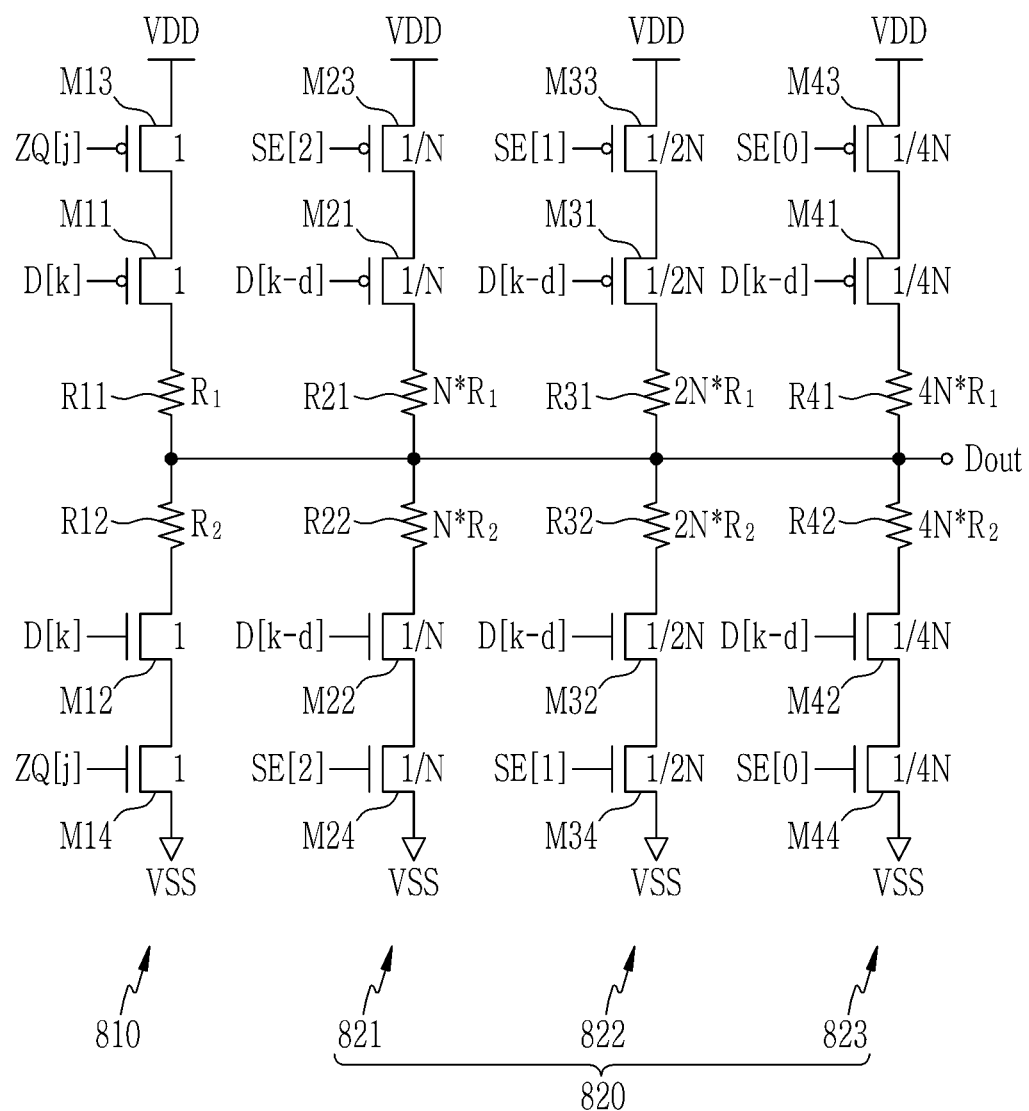
FIG. 8, FIG. 9, and FIG. 10 are circuit diagrams illustrating examples of an FFE of a transmitter according to embodiments.

FIG. 8 is a circuit diagram illustrating an example of an FFE of a transmitter according to an embodiment.

Referring to FIG. 8, an FFE 800 may include a main driver 810 and an equalizer 820. The main driver 810 may include transistors M11 and M12, and resistors R11 and R12. In some embodiments, the main driver 810 may further include transistors M13 and M14 for compensation of a PVT change or variation. The equalizer 820 may include a plurality of equalization taps 821, 822, and 823. Although FIG. 8 shows that the equalizer 820 includes three equalization taps 821, 822, and 823 for convenience, the number of equalization taps 821, 822, and 823 is not limited thereto. The equalization tap 821 may include transistors M21, M22, M23, and M24, and resistors R21 and R22, the equalization tap 822 may include transistors M31, M32, M33, and M34, and resistors R31 and R32, and the equalization tap 823 may include transistors M41, M42, M43, and M44, and resistors R41 and R42.

In some embodiments, the transistors M11-M14, M21-M24, M31-M34, and M41-M44 may be metal oxide semiconductor (MOS) transistors. Each of the transistors M11-M14, M21-M24, M31-M34, and M41-M44 may have a source, drain, and gate as a first input terminal, a second input terminal, and a control terminal, respectively. The transistors M11, M13, M21, M23, M31, M33, M41, M43 may have different channel types from the transistors M12, M14, M22, M24, M32, M34, M42, and M44. For example, the transistors M11, M13, M21, M23, M31, M33, M41, and M43 may be PMOS transistors, and the transistors M12, M14, M22, M24, M32, M34, M42, and M44 may be NMOS transistors.

The transistors M11 and M13, and the resistor R11 may be connected in series between a first power supply VDD and an output node Dout, and the transistors M12 and M14, and the resistor R12 may be connected between a second power supply VSS and the output node Dout. Input data D[k] may be input to the gates of the transistors M11 and M12, and a ZQ code may be input to the gates of the transistors M13 and M14. The first power supply VDD may be configured to supply a higher voltage than the second power supply VSS. The input data D[k] may have a bit value of original data or a bit value complementary to the bit value of the original data. The second power supply VSS may be, for example, a ground terminal. In some embodiments, the main driver 810 may include a plurality of taps (hereinafter referred to as "main taps"), and each of the main taps may include transistors M11-M14, and resistors R11 and R12. The number of main taps may be equal to the number of bits of the ZQ code. In this case, the gates of the transistors M13 and M14 of each main tap may receive a corresponding bit ZQ[j] among the bits of the ZQ code. Here, j is an integer greater than or equal to zero. Therefore, the main driver may compensate for the PVT change or variation based on the ZQ code.

The transistors M21 and M23, and the resistor R21 may be connected in series between the first power supply VDD and the output node Dout, and the transistors M22 and M24, and the resistor R22 may be connected in series between the second power supply VSS and the output node Dout. The transistors M31 and M33, and the resistor R31 may be connected in series between the first power supply VDD and the output node Dout, and the transistors M32 and M34, and the resistor R32 may be connected in series between the second power supply VSS and the output node Dout. The transistors M41 and M43, and the resistor R41 may be connected in series between the first power supply VDD and the output node Dout, and the transistors M42 and M44, and the resistor R42 may be connected in series between the second power supply VSS and the output node Dout.

Delay data D[k−d] may be input to the gates of the transistors M21, M22, M31, M32, M41, and M42. One bit of the equalization compensation signal SE may be input to the gates of the transistors M23 and M24, another bit of the equalization compensation signal SE may be input to the gates of the transistors M33 and M34, and, yet another bit of the equalization compensation signal SE may be input to the gates of the transistors M43 and M44. In this case, the equalization compensation signal SE may be a 3-bit signal. The equalization compensation signal SE may be an equalization compensation signal SE1 provided by an encoder 330 shown in FIG. 3 or an equalization compensation signal SE2 provided by an encoder 432 shown in FIG. 4. In some embodiments, the equalization compensation signal SE may correspond to the three most significant bits of the ZQ code.

In some embodiments, a resistance $N*R_1$ of the resistor R21 may be set to N times a resistance $R_1$ of the resistor R11, and a resistance value $N*R_2$ of the resistor R22 may be set to N times a resistance $R_2$ of the resistor R12. Further, a resistance value $2N*R_1$ of the resistor R31 may be set to 2N times the resistance value $R_1$ of the resistor R11, and a resistance value $2N*R_2$ of the resistor R32 may be set to 2N times the resistance $R_2$ of the resistor R12. Further, a resistance value $4N*R_1$ of the resistor R41 may be set to 4N times the resistance value $R_1$ of the resistor R11, and a resistance value 4N*R$_2$ of the resistor R42 may be set to 4N times the resistance R$_2$ of the resistor R12. In this case, the most significant bit SE[2] of the equalization compensation signal SE may be input to the gates of the transistors M23 and M24, and the next significant bit SE[1] of the equalization compensation signal SE may be input to the gates of the transistor M33, and M34, and the least significant bit SE[0] of the equalization compensation signal SE may be input to the gates of the transistors M43 and M44.

In some embodiments, sizes of the transistors M21, M31, and M41 may be 1/N, ½N, and ¼N of a size of the transistor M11, respectively, and sizes of the transistors M22, M32, and M42 may be 1/N, ½N, and ¼N of a size of the transistor M12, respectively. Further, sizes of the transistors M23, M33, and M43 may be 1/N, ½N, and ¼N of a size of the transistor M13, respectively, and sizes of transistors M24, M34, and M44 may be 1/N, ½N and ¼N of a size of the transistor M14, respectively.

In the FFE 800, a main coefficient may be set based on transistors that are turned on in response to the input data D[k] and the bit ZQ[j] of the ZQ code among the transistors M11-M14, and a resistor that is connected to the turned-on transistors among the resistors R11 and R12. Further, an equalization coefficient may be set based on transistors that are turned on in response to the delay data D[k−d] and the equalization compensation signal SE among the transistors M21-M44, and resistors that are connected to the turned-on transistors among the resistors R21-R42.

Figure 9:
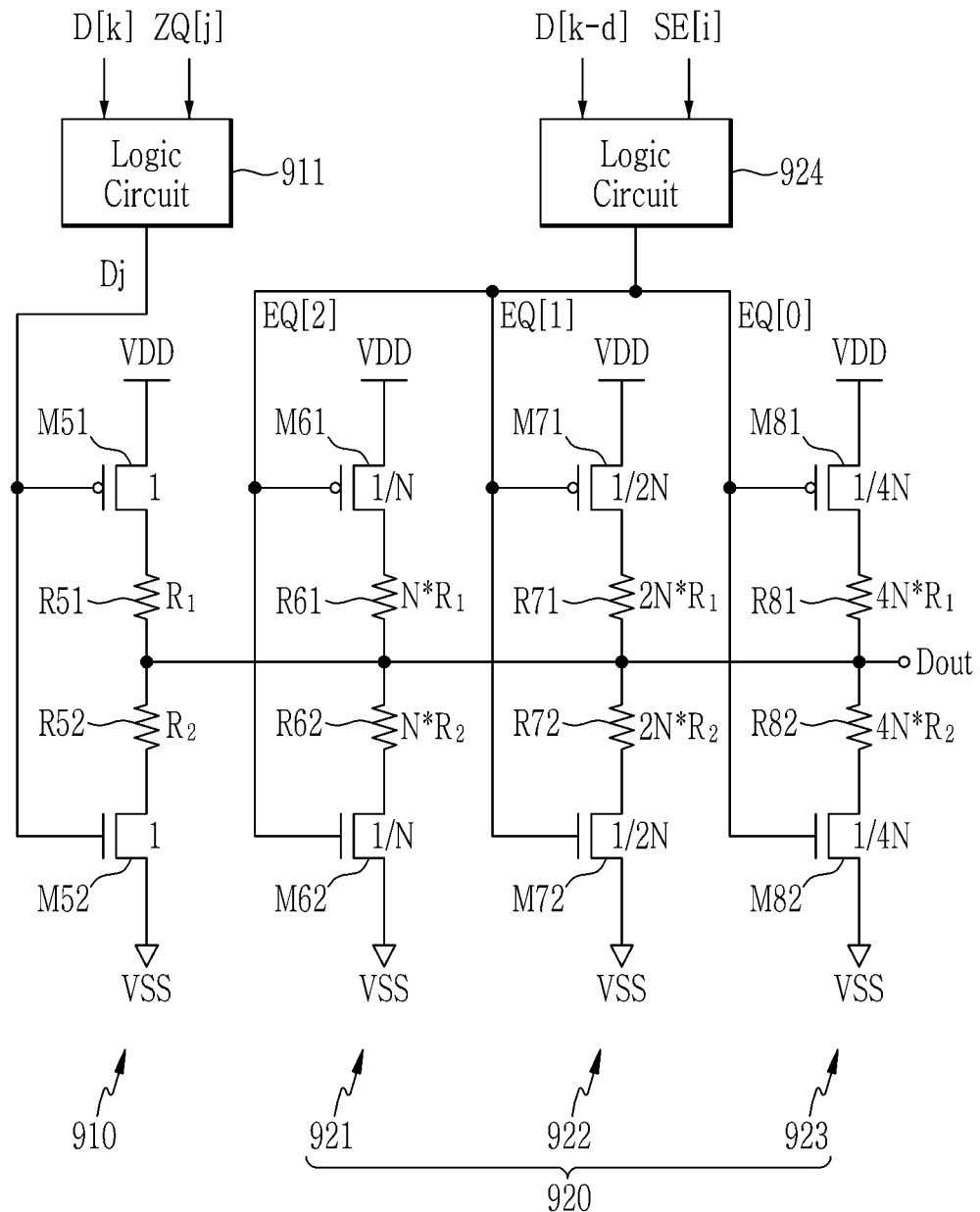

FIG. 9 is a circuit diagram illustrating an example of an FFE of a transmitter according to an embodiment.

Referring to FIG. 9, an FFE 900 may include a main driver 910 and an equalizer 920. The main driver 910 may include transistors M51 and M52, and resistors R51 and R52. The equalizer 920 may include a plurality of equalization taps 921, 922, and 923. Although FIG. 9 shows that the equalizer 920 includes three equalization taps 921, 922, and 923 for convenience, the number of equalization taps 921, 922, and 923 is not limited thereto. The equalization tap 921 may include transistors M61 and M62, and resistors R61, and R62, the equalization tap 922 may include transistors M71 and M72, and resistors R71 and R72, and the equalization tap 923 may include transistors M81 and M82, and resistors R81 and R82.

In some embodiments, the transistors M51, M52, M61, M62, M71, M72, M81, and M82 may be MOS transistors. The transistors M51, M61, M71, and M81 may have different channel types from the transistors M52, M62, M72, and M82. For example, the transistors M51, M61, M71, and M81 may be PMOS transistors, and the transistors M52, M62, M72, and M82 may be NMOS transistors.

The transistor M51 and the resistor R51 may be connected in series between a first power supply VDD and the output node Dout, and the transistor M52 and the resistor R52 may be connected in series between the second power supply VSS and the output node Dout. The first power supply VDD may be configured to supply a higher voltage than the second power supply VSS. In this case, input data D[k] may have a bit value complementary to a bit value of original data. The second power supply VSS may be, for example, a ground terminal.

In some embodiments, the main driver 910 may further include a plurality of logic circuits 911 to compensate for a PVT change or variation. The number of logic circuits 911 may be equal to the number of bits of a ZQ code. Each logic circuit 911 may generate a data bit Dj based on the input data D[k] and a corresponding bit ZQ[j] among the bits of the ZQ code. Further, the main driver 910 may include a plurality of main taps, and each of the main taps may include the transistors M51 and M52, and resistors R51 and R52. The number of main taps may be equal to the number of bits of the ZQ code, i.e., the number of logic circuits 911. In this case, gates of the transistors M51 and M52 of each main tap may receive the data bit Dj output from a corresponding logic circuit 911 among the plurality of logic circuits 911. Accordingly, the main driver 910 may be configured to compensate for the PVT change based on the ZQ code. In some embodiments, the logic circuit 911 may be configured to output '1' if both the input data D[k] and the corresponding bit ZQ[j] of the ZQ code are '1', or may be configured to output '0' if both the input data D[k] and the corresponding bit ZQ[j] of the ZQ code are '0'. The logic circuit 911 may be, for example, an AND gate or an OR gate, but is not limited thereto.

The transistor M61 and the resistor R61 may be connected in series between the first power supply VDD and the output node Dout, and the transistor M62 and the resistor R62 may be connected in series between the second power supply VSS and the output node Dout. The transistor M71 and the resistor R71 may be connected in series between the first power supply VDD and the output node Dout, and the transistor M72 and the resistor R72 may be connected in series between the second power supply VSS and the output node Dout. The transistor M81 and the resistor R81 may be connected in series between the first power supply VDD and the output node Dout, and the transistor M82 and the resistor R82 may be connected in series between the second power supply VSS and the output node Dout.

The equalizer 920 may further include a plurality of logic circuits 924 to generate an equalization signal. The number of logic circuits 924 may be equal to the number of bits of an equalization compensation signal SE. Each logic circuit 924 may perform a logical operation on delay data D[k−d] and a corresponding bit SE[i] of the equalization compensation signal SE to generate a corresponding bit EQ[i] of the equalization signal. Here, i is an integer greater than or equal to zero. The equalization compensation signal SE may be an equalization compensation signal SE1 provided by an encoder 330 shown in FIG. 3 or an equalization compensation signal SE2 provided by an encoder 432 shown in FIG. 4. The equalization compensation signal SE may correspond to, for example, the three most significant bits of the ZQ code. When the equalization compensation signal SE has three bits, the three logic circuits 924 may generate the bits EQ[2], EQ[1], and EQ[0] of the equalization signal, respectively. In this case, one bit EQ[2] of the equalization signal may be input to gates of transistors M61 and M62, another bit EQ[1] of the equalization signal may be input to gates of transistors M71 and M72, and yet another bit EQ[0] of the equalization signal may be input to gates of the transistors M81 and M82. In some embodiments, the logic circuit 924 may be configured to output '1' if both the delay data D[k−d] and the corresponding bit SE[i] of the equalization compensation signal SE are '1', or may be configured to output '0' if both the delay data D[k−d] and the corresponding bit SE[i] of the equalization compensation signal SE are '0'. The logic circuit 924 may be, for example, an AND gate or an OR gate, but is not limited thereto.

In some embodiments, resistances of the resistors R51-R82 and sizes of the transistors M51-M82 may be set as described with reference to FIG. 8.

In the FFE 900, a main coefficient may be set based on a transistor that is turned on in response to the output Dj of the logic circuit 911 among the transistors M51 and M52, and a resistor that is connected to the turned-on transistor among the resistors R11 and R12. Further, an equalization coefficient may be set based on transistors that are turned on in response to the output EQ[i] of the logic circuit 924 among the transistors M61-M82, and resistors that are connected to the turned-on transistors among the resistors R61-R82.

Figure 10:
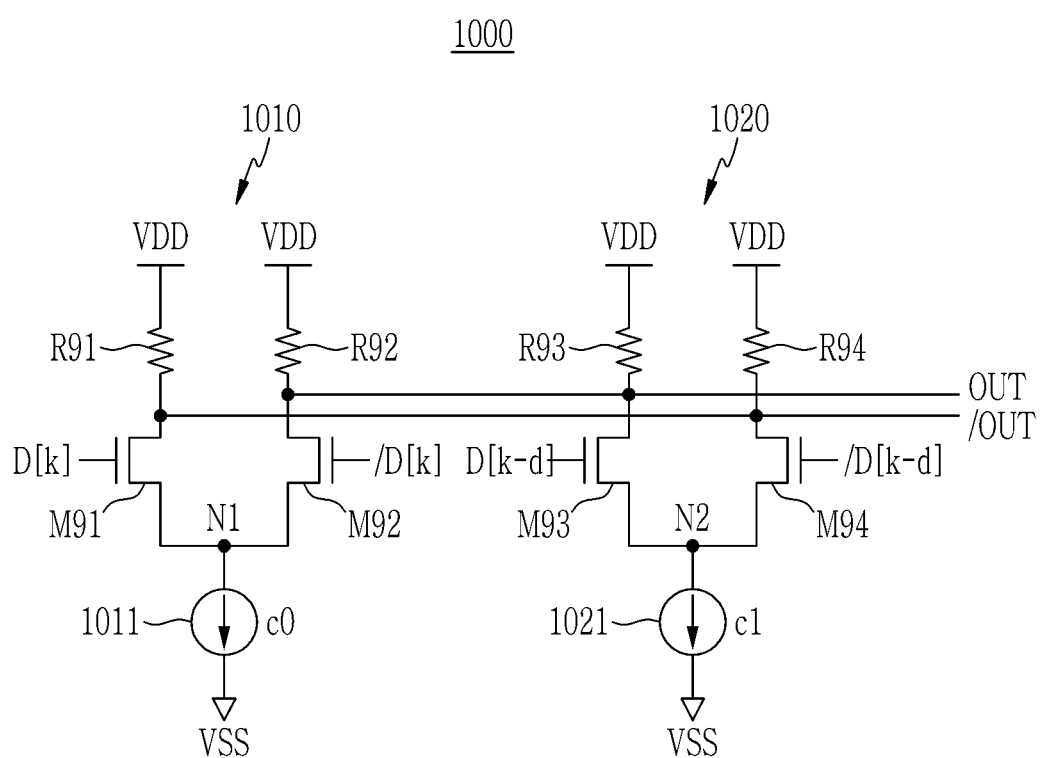

FIG. 10 is a circuit diagram illustrating an example of an FFE of a transmitter according to an embodiment.

Referring to FIG. 10, an FFE 1000 may include a main driver 1010 and an equalizer 1020. The main driver 1010 may include transistors M91 and M92, resistors R91 and R92, and a current source 1011. The equalizer 1020 may include transistors M93 and M94, resistors R93 and R94, and a current source 1021. In some embodiments, the transistors M91-M94 may be MOS transistors. The transistors M91-M94 may be, for example, NMOS transistors.

The resistor R91 may be connected between a first power supply VDD and a complementary output node /Out, and the transistor M91 may be connected between the complementary output node /Out and a node N1. The resistor R92 may be connected between the first power supply VDD and an output node Out, and the transistor M92 may be connected between the output node Out and the node N1. Input data D[k] may be input to a gate of transistor M91, and complementary input data having a bit value (referred to as "complementary bit value")/D[k] complementary to a bit value of input data D[k] may be input to a gate of transistor M92. The current source 1011 may be connected between the node N1 and a second power supply VSS, and a current size of the current source 1011 may be determined based on a main coefficient c0. In some embodiments, the main coefficient c0 may be adjusted based on a ZQ code.

The resistor R93 may be connected between the first power supply VDD and the output node Out, and the transistor M93 may be connected between the output node Out and a node N2. The resistor R94 may be connected between the first power supply VDD and the complementary output node /Out, and the transistor M94 may be connected between the complementary output node /Out and the node N2. Delay data D[k–d] may be input to a gate of transistor M93, and complementary delay data/D[k–d] having a complementary bit value of the delay data D[k–d] may be input to a gate of transistor M94. The current source 1021 may be connected between the node N2 and the second power supply VSS, and a current size of the current source 1021 may be determined based on an equalization coefficient c1. In some embodiments, the equalization coefficient c1 may be adjusted based on an equalization compensation signal SE. The equalization compensation signal SE may be an equalization compensation signal SE1 provided by an encoder 330 shown in FIG. 3 or an equalization compensation signal SE2 provided by an encoder 432 shown in FIG. 4.

For example, when the input data D[k] is '1' and the delay data D[k–d] is '0', the turned-on transistors M91 and M94 may connect the complementary output node /Out with the current sources 1011 and 1021 to determine a voltage of the complementary output node /Out, and the turned-off transistors M92 and M93 may block the current sources 1011 and 1021 from the output node Out to determine a voltage of the output node Out.

Figure 11:
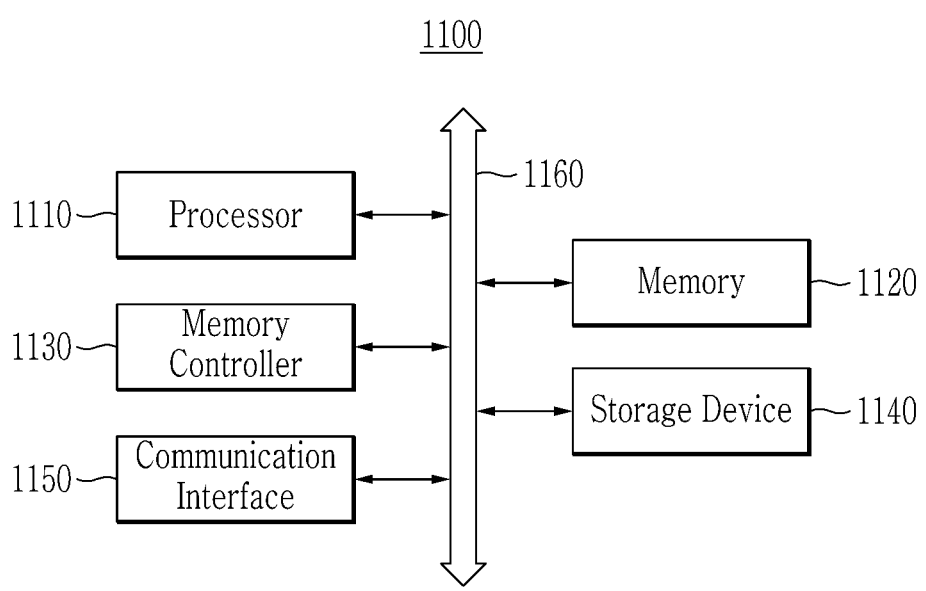
FIG. 11 is a block diagram illustrating an example of a computing device according to an embodiment.

FIG. 11 is a block diagram showing an example of a computing device according to an embodiment.

Referring to FIG. 11, a computing device 1100 may include a processor 1110, a memory 1120, a memory controller 1130, a storage device 1140, a communication interface 1150, and a bus 1160. The computing device 1100 may further include other components.

The processor 1110 may be configured to control an overall operation of each component of the computing device 1100. The processor 1110 may be implemented with at least one of various processing units, such as a central processing unit (CPU), an application processor (AP), and a graphic processing unit (GPU).

The memory 1120 may be configured to store various data and instructions. The memory 1120 may include a transmitter circuit described with reference to FIG. 1 to FIG. 10. The memory controller 1130 may be configured to control transfers of data or instructions to and from the memory 1120. The memory controller 1130 may include the transmitter circuit embodiments described with reference to FIG. 1 to FIG. 10. In some embodiments, the memory controller 1130 may be provided as a separate chip from the processor 1110. In some embodiments, the memory controller 1130 may be provided as an internal component of the processor 1110.

The storage device 1140 may non-temporarily store programs and data. In some embodiments, the storage device 1140 may be implemented as a non-volatile memory. The communication interface 1150 may be configured to support wired or wireless Internet communication of the computing device 1100. In addition, the communication interface 1150 may be configured to support various communication methods other than Internet communication. The bus 1160 may provide a communication function between the components of the computing device 1100. The bus 1160 may include at least one type of bus according to a communication protocol between the components.

While embodiments of the invention have been described in connection with what is presently considered to be practical examples, it is to be understood that the invention is not limited to the disclosed embodiments. On the contrary, it is intended to cover various modifications and equivalent arrangements included within the spirit and scope of the appended claims.

What is claimed is:

1. A transmitter circuit, comprising:
   an encoder configured to receive an impedance code that is generated based on impedance calibration for impedance matching and to generate a delay compensation signal based on the impedance code;
   a delay circuit configured to output delay data that are delayed by a delay value from input data, the delay value being determined based on the delay compensation signal; and
   a feed-forward equalizer (FFE) configured to receive the input data and the delay data, and to equalize the input data based on a main coefficient used for the input data and an equalization coefficient used for the delay data to generate transmission data.

2. The transmitter circuit of claim 1, wherein the encoder is further configured to generate the delay compensation signal for decreasing the delay value when the impedance code indicates a process-voltage-temperature (PVT) variation in which a delay increases.

3. The transmitter circuit of claim 1, wherein the encoder is further configured to generate the delay compensation signal for increasing the delay value when the impedance code indicates a PVT variation in which a delay decreases.

4. The transmitter circuit of claim 1, wherein the encoder is further configured to generate an equalization compensation signal based on the impedance code, and
   wherein the FFE is further configured to determine the equalization coefficient based on the equalization compensation signal.

5. The transmitter circuit of claim 4, wherein the encoder is further configured to generate the equalization compensation signal for increasing the equalization coefficient when the impedance code indicates a PVT variation in which a delay increases.

6. The transmitter circuit of claim 4, wherein the encoder is further configured to generate the equalization compensation signal for decreasing the equalization coefficient when the impedance code indicates a PVT variation in which a delay decreases.

7. The transmitter circuit of claim 4, wherein the equalization compensation signal comprises a predetermined number of most significant bits in the impedance code.

8. The transmitter circuit of claim 4, wherein:
the FFE comprises a plurality of equalization taps corresponding to a plurality of bits of the equalization compensation signal, respectively;
wherein each of the plurality of equalization taps comprises:
a first transistor, a second transistor, and a first resistor connected in series between a first power supply and an output node, and
a third transistor, a fourth transistor, and a second resistor connected in series between the output node and a second power supply;
the third transistor and the fourth transistor have different channel types from the first transistor and the second transistor;
the first transistor and the third transistor are configured to operate in response to the delay data; and
the second transistor and the fourth transistor are configured to operate in response to a corresponding bit among the plurality of bits of the equalization compensation signal.

9. The transmitter circuit of claim 4, wherein:
the FFE comprises a plurality of equalization taps corresponding to a plurality of bits of the equalization compensation signal, respectively;
wherein each of the plurality of equalization taps comprises:
a first transistor and a first resistor connected in series between a first power supply and an output node, and
a second transistor and a second resistor connected in series between the output node and a second power supply;
the second transistor has a different channel type from the first transistor; and
the first transistor and the second transistor are configured to operate in response to a bit generated by a logical operation of the delay data and a corresponding bit among the plurality of bits of the equalization compensation signal.

10. The transmitter circuit of claim 4, wherein the FFE comprises:
a first resistor connected between a first power supply and a first output node;
a second resistor connected between the first power supply and a second output node;
a third resistor connected between the first power supply and the second output node;
a fourth resistor connected between the first power supply and the first output node;
a first transistor connected between the first output node and a first node, and configured to operate in response to a bit value of the input data;
a second transistor connected between the second output node and the first node, and configured to operate in response to a complementary bit value of the input data;
a third transistor connected between the second output node and a second node, and configured to operate in response to a bit value of the delay data;
a fourth transistor connected between the first output node and the second node, and configured to operate in response to a complementary bit value of the delay data;
a first current source connected between the first node and the second power supply; and
a second current source connected between the second node and the second power supply, and configured to output a current whose size is determined based on the equalization compensation signal.

11. The transmitter circuit of claim 1, wherein the FFE is further configured to output the transmission data by subtracting a first value determined based on the delay data and the equalization coefficient from a second value determined based on the input data and the main coefficient.

12. A transmitter circuit, comprising:
a delay circuit configured to delay input data by a delay value to generate output delay data;
a delay replica configured to have a same delay characteristic as the delay circuit;
a first encoder configured to generate a delay compensation signal based on information from the delay replica, the delay circuit being further configured to determine the delay value based on the delay compensation signal; and
a feed-forward equalizer (FFE) configured to receive the input data and the delay data, and to equalize the input data based on a main coefficient used for the input data and an equalization coefficient used for the delay data to generate transmission data.

13. The transmitter circuit of claim 12, wherein as a delay value of the delay replica increases, the first encoder generates the delay compensation signal for decreasing the delay value of the delay circuit.

14. The transmitter circuit of claim 12, wherein as a delay value of the delay replica decreases, the first encoder generates the delay compensation signal for increasing the delay value of the delay circuit.

15. The transmitter circuit of claim 12, further comprising:
a second encoder configured to receive an impedance code that is generated based on impedance calibration for impedance matching and to generate an equalization compensation signal based on the impedance code, and
wherein the FFE is further configured to determine the equalization coefficient based on the equalization compensation signal.

16. The transmitter circuit of claim 15, wherein the second encoder is further configured to, when the impedance code indicates a process-voltage-temperature (PVT) variation in which a delay increases, generate the equalization compensation signal for increasing the equalization coefficient.

17. The transmitter circuit of claim 15, wherein the second encoder is further configured to, when the impedance code indicates a PVT variation in which a delay decreases, generate the equalization compensation signal for decreasing the equalization coefficient.

18. The transmitter circuit of claim 15, wherein the equalization compensation signal comprises a predetermined number of most significant bits of the impedance code.

19. A transmitter circuit, comprising:
- an encoder configured to receive an impedance code that is generated based on impedance calibration for impedance matching and to generate an equalization compensation signal based on the impedance code;
- a delay circuit configured to output delay data that are delayed by a delay value from input data; and
- a feed-forward equalizer (FFE) configured to receive the input data and the delay data, to determine an equalization coefficient used for the delay data based on the equalization compensation signal, and to equalize the input data based on a main coefficient used for the input data and the equalization coefficient to generate transmission data.

20. The transmitter circuit of claim 19, wherein the equalization compensation signal comprises a predetermined number of most significant bits of the impedance code.

* * * * *